2,779,805

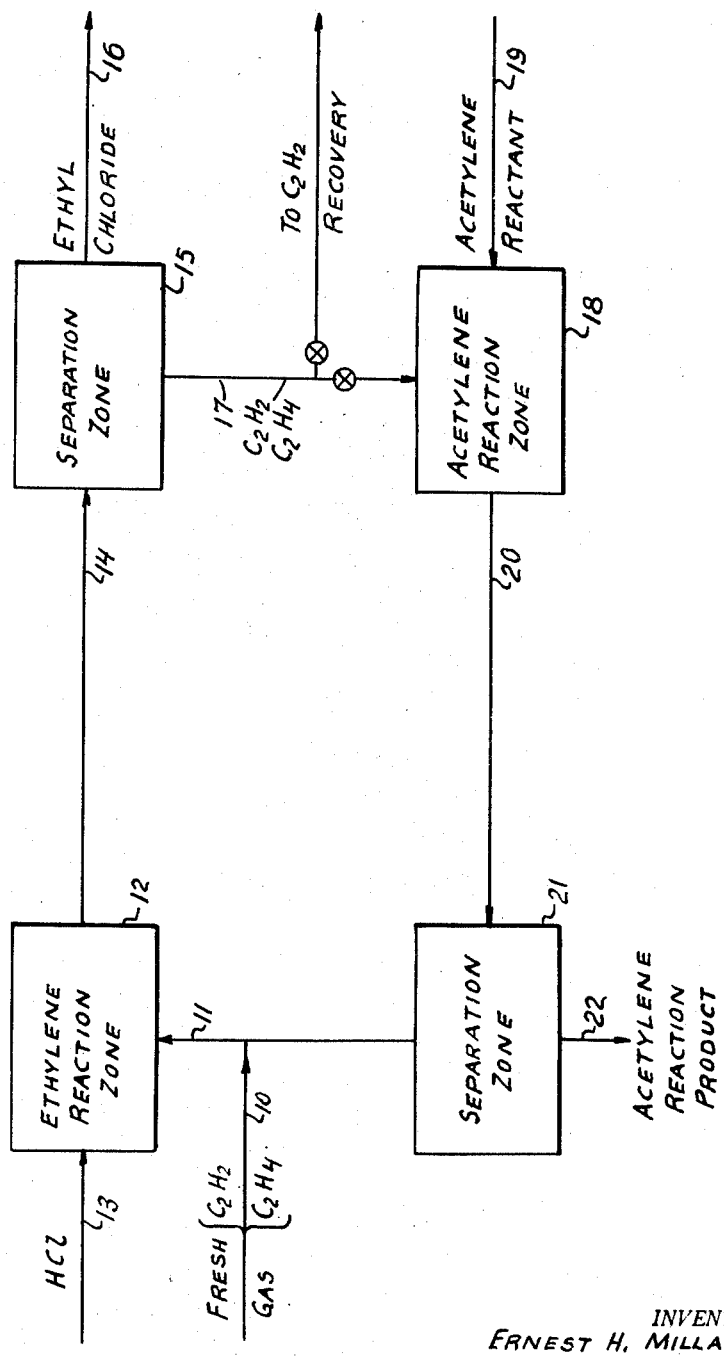

United States Patent Office
Patented Jan. 29, 1957

2,779,805

SEPARATION OF ACETYLENE FROM ETHYLENE BY HYDROCHLORINATION OF THE ETHYLENE

Ernest H. Millard, Jr., Niagara Falls, N. Y., assignor to Olin Mathieson Chemical Corporation, a corporation of Virginia Application June 11, 1952, Serial No. 292,847

1 Claim. (Cl. 260—663)

This invention relates to the utilization of acetylene-ethylene mixtures such as those obtained by the cracking of relatively saturated hydrocarbons. More particularly it relates to the chemical utilization of ethylene in such mixtures by selective reaction to form ethyl chloride, simultaneously producing a residue gas enriched in acetylene and then converting the residual acetylene into useful products in a second stage.

The production of mixed unsaturated gases by the drastic cracking or dehydrogenation of relatively saturated charge stocks, particularly ethane, ethane-propane mixtures and heavier hydrocarbons is well known. Various processes are available for the production of such unsaturated mixtures comprising various proportions of acetylene, ethylene and hydrogen with minor amounts of other products as impurities.

By so-called "shallow" cracking, about 30–35 percent of unsaturates may be obtained in the resulting gas and the yields of acetylene and ethylene total about 70–75 percent. Where ethylene is the product principally desired, the dehydrogenation conditions may be controlled so as to produce the maximum yield of thylene and the minimum production of acetylene. Selective hydrogenation of the acetylene to ethylene can be used to produce a gas fairly readily separable into an ethylene component free of acetylene and other contaminants. In spite of the waste of the acetylene produced, much ethylene has been prepared by this process.

Where acetylene is the primary product desired, the cracking must be extremely severe. Such operations, usually termed "deep" cracking, in general require rapid heating combined with quick quenching to produce satisfactory yields and conversions. Yields of only about 50–55 percent of acetylene in concentrations of 15–17 percent in the gas are obtained. Ethylene is usually absent. The conditions for deep cracking provided, for example, by the use of regenerative furnaces are so severe that even the best of modern refractories have a relatively short life. Extensive purification operations are necessary to separate acetylene from the cracked gases. To obtain pure acetylene, the industry has alternatively turned to the calcium carbide method of generation. The cost of acetylene by the latter method is about the same as by cracking hydrocarbons, taking into account the expensive purification required following the cracking process.

Thus acetylene and ethylene are obtainable as chemical individuals by cracking saturated hydrocarbons, but each requires separation and purification steps largely nullifying the economic advantage of low raw-materials cost. Although the unsaturates may be separated readily from hydrogen, methane and the heavier ends in such mixtures, by well known means, for example, adsorption and desorption, and thus acetylene-ethylene mixtures relatively free of other constituents may be produced, the further separation of acetylene from ethylene by physical methods, for example, distillation under pressure or by the use of selective solvents is too expensive to be economically feasible. Hence, utilization of the low cost shallow cracking process for producing mixtures of acetylene and ethylene which has a theoretically tremendous economic advantage over the deep cracking processes is not feasible because of the difficulty and expense of physically separating the two unsaturates.

I have discovered however that mixtures of acetylene and ethylene derived in this manner by gas cracking can be directly utilized in chemical reaction without pre-separation of either component by passing the mixture of unsaturated gases through a reaction zone in which it is reacted with hydrogen chloride in contact with a zinc chloride-impregnated active carbon catalyst at about 140° to 200° C. The ethylene is preferentially converted to ethyl chloride, while surprisingly the acetylene passes through the reaction zone substantially unconverted. The minor amount of vinyl chloride produced by acetylene conversion is separable from the ethyl chloride by fractional distillation. Following the catalytic hydrochlorination reaction, the residual gas can be reacted in a second reaction zone in a system selectively converting the acetylene to a selected derivative product.

The feed gas in the present invention may comprise a major proportion of acetylene or ethylene and the cracking operation may be controlled to produce these components in any proportions desired in the products of chemical conversion. Suitable gas mixtures for use according to the present invention may be obtained by cracking saturated hydrocarbons or mixtures of saturated hydrocarbons at temperatures between about 1100 and 1600° C. or higher using short contact times. Cracking conditions are controlled to yield a product containing acetylene and ethylene in any desired proportion but preferably in about equimolar quantities. Usually substantially all of the saturates are cracked in one pass.

The hydrocarbon charge stock may comprise normally gaseous and/or normally liquid saturated hydrocarbons from any suitable source, for example, natural gas, casinghead gasoline, natural gasoline, naphtha fractions or even higher boiling hydrocarbon fractions. Preferably, however, a relatively pure ethane fraction is used as charge stock. Cracking ethane under shallow cracking conditions produces a particularly desirable mixture comprising largely ethylene, acetylene and hydrogen uncontaminated by other olefins or unsaturated hydrocarbons. In contrast, using propane or propane-containing fractions as feed stock, considerable proportion of propylene may be present in the gas. However, such unsaturated mixtures containing propylene, for example, may be used in the process of the present invention when the mixed olefins are converted to mixed alkyl chlorides. The latter are readily separable by distillation and may be utilized for the preparation of other reaction products. Alternatively, propylene is readily separable from ethylene by absorption in sulfuric acid of appropriate concentration.

Deep cracking of charge stocks containing appreciable amounts of propane and higher hydrocarbons produces mixtures substantially free of higher molecular weight unsaturates and thus may be used to produce suitable unsaturated gas mixtures for use according to the present invention.

In the cracking operation any suitable cracking reactor for pyrolytic conversion of hydrocarbons may be employed. Tubular furnaces may be used for the shallow cracking of ethane but for the deep cracking of higher saturated hydrocarbons, regenerative type furnaces or pebble furnaces are advantageous. In regenerative type furnaces, the hydrocarbons are passed through narrow elongated passages defined by non-catalytic refractory material of high heat conductivity, for example, silicon carbide. In pebble furnaces the hydrocarbons are passed through beds of pebbles or fragments of refractory material maintained at cracking temperatures by the combustion of waste gases in a separate zone. The conditions necessary comprise the use of temperatures within the range of about 1100 to 1600° C. and preferably from about 1200 to 1350° C. Atmospheric or subatmospheric pressure may be maintained within the cracking zone. Contact times do not usually exceed 25 seconds and preferably are not more than about 15 seconds. Suitable quenching means are used to restrict the reaction periods. Steam or other inert gas may be added to the hydrocarbon charged to provide conditions suitable for the conversion to mixtures of acetylene and ethylene. The relative proportions of these two components in the cracked product may be controlled by varying the cracking conditions within the above defined limits. Usually an increase in temperature and an increase in contact time within these ranges serves to increase the proportion of acetylene. The effluent gas from the cracking unit is suitably separated, for example, by adsorption and desorption into a hydrogen-saturated hydrocarbon fraction, an acetylene-ethylene fraction and a fraction of higher boiling components.

The acetylene-ethylene fraction as a mixture is treated with hydrogen chloride to convert ethylene preferentially into ethyl chloride. Acetylene is usually considered a much more reactive hydrocarbon than ethylene, but surprisingly, under the conditions of this reaction, acetylene passes through the reactor and is converted to vinyl chloride only to a minor degree. The residual gas may be recycled or passed through subsequent hydrochlorination stages until the ethylene content is substantially removed. The resulting acetylene then is suitable for chemical uses or for sale as a product. Advantageously however the hydrochlorination reaction is carried only to partial completion and a gas enriched in acetylene and reduced in ethylene content is charged to a second reaction stage in which acetylene is selectively converted into a derivative product by a reaction in which the residual ethylene does not react. By control of the extent of conversion in the second stage, an ultimate residual acetylene-ethylene mixture may be obtained if desired which is suitable in relative proportions for recycle with fresh feed to the ethylene-removing stage. Inerts buildup in the gas stream may be prevented by diverting a slip stream intermittently or continuously to the primary unsaturates-separating step of the thermal cracking reaction stage.

I have found that ethyl chloride is produced in good yields and at satisfactory conversion levels by passing of ethylene, acetylene and hydrogen chloride in gaseous admixture over a zinc chloride-impregnated active carbon catalyst at 140–200° C. The zinc salts, e. g. zinc acetate also catalyze the reaction. The temperatures within the range of about 140–200° C. are useful although about 150–175° C. are preferred. Conversion is low at temperatures below about 140° C. and above about 200° C. The contact time preferably is about 50 to 70 seconds but may be as short as 20 seconds or as long as 100 seconds. At the higher temperatures, shorter contact times are preferred to avoid decomposition of the products first formed. At the lower temperatures longer contact times are necessary to promote maximum addition of hydrogen chloride. Longer contact times at elevated temperatures tend to increase the proportion of vinyl chloride to ethyl chloride, the former being thermally more stable. To increase the proportion of ethyl chloride short contact times at the higher temperatures are preferred. The ratio of the two products also depends materially on the ratio of ethylene to acetylene in the charge gas, an increase in this ratio increasing the proportion of ethyl chloride in the product.

In the second stage, the residue gas from the first stage, freed of reaction products and usually any excess hydrogen chloride that may have been employed is treated in a second reaction zone to convert acetylene to a useful reaction product without substantial reaction of any unreacted ethylene. For example, the residual acetylene may be selectively converted in the second zone by one of the following reactions:

1. Vinyl chloride may be prepared by passing the ethylene-depleted gas, together with an excess of hydrogen chloride gas, based on the acetylene content of the charged gas, over activated carbon impregnated with mercuric chloride at temperatures of about 175–220° C. and a contact time of 20 to 25 seconds. Under these conditions ethylene does not react. The vinyl chloride is separated from the residual gas by condensation at relatively low temperatures and the residual mixture is recycled to the first stage.

This is a particularly advantageous combination process since there is no need to separate any excess hydrogen chloride that may have been employed in either the ethylene or acetylene hydrochlorination stages and since the small proportions of vinyl chloride formed concomitantly with the ethyl chloride may be combined with the product of the second step for final purification.

2. Vinyl acetate may be prepared as described in pending application Serial No. 292,902, filed June 11, 1952, of Robert M. Thomas and Ernest H. Millard, Jr., from the residue gas and acetic acid in the vapor-phase using a zinc or cadmium catalyst, for example, zinc acetate, at temperatures of about 175–225° C. Alternatively, if the ethylene is removed in the first stage until it comprises less than about 10 percent of the gaseous mixture by volume, the reaction may be conducted in the liquid-phase. In this case, a suitable catalyst may be prepared, for example, by dissolving about 4 grams of mercuric oxide, 1.5 grams of boron trifluoride and 0.5 gram of hydrogen fluoride in 1 kilogram of acetic acid. The mixed gas is passed through this catalyst solution at temperatures of 30–55° C. In batch operation dry sodium acetate is added to the solution to destroy the catalysts and the solution is distilled to recover vinyl acetate and acetic acid. In a continuous system of operation a portion of the catalyst mixture is continuously withdrawn, neutralized and distilled, the recovered acetic acid being recharged with fresh catalyst mixture to the reaction chamber. The gas passing from the reaction mixture is scrubbed and/or refrigerated to remove acetic acid and vinyl acetate therefrom and is recycled to the first stage reaction.

3. Dichloroethylene, CHCl:CHCl, is prepared as described in pending application Serial No. 292,901, filed June 11, 1952, of Robert M. Thomas and John W. Churchill by passing the residual mixture of acetylene and ethylene through a solution containing cuprous chloride, cupric chloride and ammonium chloride in aqueous hydrochloric acid. The catalyst system is activated by contact with about 2 moles of hydrogen chloride per mole of acetylene and an excess of air in the same or a separately conducted operation. Using this catalyst, a major proportion of the acetylene charged is reacted and converted to transdichloroethylene. Ethylene does not react under these conditions. The dichloroethylene is separated by partial condensation or scrubbing and the residual gas is recycled to the first stage.

The resulting trans-dichloroethylene is useful for the manufacture of vinylidene chloride by the addition of hydrogen chloride and subsequent demuriation, for the preparation of trichloroethylene by the addition of chlorine and subsequent demuriation and for the preparation of perchloroethylene by the addition of chlorine to trichloroethylene and demuriation of the resulting pentachloroethane to tetrachloroethylene.

4. Acrylonitrile may be prepared from the gaseous mixture depleted in ethylene in the first stage by contacting the gas with suitable proportions of hydrogen cyanide in the presence of a catalyst, for example, 0.8 mole of potassium chloride, 0.2 mole of sodium chloride and 1 mole of cuprous chloride. Suitably only about 0.1 to 0.2 mole of hydrogen cyanide is introduced per mole of acetylene in the gas and the proportion of cuprous chloride in the catalyst mixture stands in a ratio of about 40 to 50 parts by weight per part of hydrogen cyanide.

When the acetylene content of the gas is particularly low, the vapor-phase conversion of the acetylene to the acrylonitrile is preferred. Thus, a mixture of the gas with somewhat less than the stoichiometric amount of HCN based on the acetylene content of the gas is passed at about 400–700° C. over a catalyst comprising barium oxide precipitated on carbon. Conversions and yields are excellent while the ethylene content of the gas is unaffected.

5. Acetylenic alcohols may be prepared as described in pending application Serial No. 294,395, filed June 19, 1952, now Patent No. 2,742,517, of Victor C. Fusco by absorbing the acetylene from the gas mixture in a suspension of finely divided potassium hydroxide in an inert solvent, e. g. xylene, in which ethylene is unabsorbed. Addition of an aldehyde or ketone while continuing the passage of acetylene produces the desired carbinol. For example, acetone gives rise to 2-methyl-3-butyn-2-ol and acetaldehyde to 3-butyn-2-ol. Vinyl ethers are formed by the reaction of alcohols in the suspension. Thus n-butanol forms vinyl n-butyl ether.

6. Butynediol-1,4 may be prepared from the residue gas from the first stage by introduction of the gas under a pressure of about 75 p. s. i. g. together with an aqueous 15 percent formaldehyde solution to a reactor packed with copper acetylide-coated silica. The temperature maintains itself at about 100–120° C. and the effluent liquor contains about 5 percent of unreacted formaldehyde. By passage of the liquor with additional quantities of the gas mixture through a second reactor, the quantity of formaldehyde present is reduced to about 0.5 percent. The gaseous effluent from both reactors is purified by refrigeration and may be recycled to the first stage of the process of the present invention. On distillation of the reactor liquid, small proportions of propargyl alcohol and major proportions of butynediol-1,4 are obtained.

7. Vinyl ethers are prepared by introducing the residue gas from the first stage into a system comprising an alcohol and a small amount of the corresponding sodium alcoholate dissolved therein. About 0.5–2 percent of the alcoholate acts as catalyst. Temperatures range from 120–200° C., preferably about 180° C., except in the case of methanol. In the case of methanol the reaction is very rapid even at 120° C. (under a pressure of 300 p. s. i. g.). Pressure is applied sufficient to maintain the alcohol in the liquid phase. The alkyl vinyl ethers are separated from the gas stream by refrigeration and/or from the alcohol solution by distillation depending on the volatility of the ether.

8. Styrene may be prepared from the acetylene-rich residue gas from the first stage particularly when several hydrochlorination steps have reduced the ethylene content to very minor proportions by passing it together with benzene in the vapor phase over a suitable catalyst. For example, a mixture of about 5 to 20 moles of benzene per mole of acetylene in the residue gas is introduced at a pressure of 100 to 600 p. s. i. over a catalyst consisting of calcined mixed hydrogels of silica and alumina at a temperature of about 350–500° C. The resulting mixture is quenched, distilled and/or solvent extracted to recover the styrene. Residual unreacted gases, freed of benzene and other higher boiling products may be recycled to the first stage.

My invention will be illustrated by means of the following examples.

*Example I–A*

A hydrocarbon gas mixture such as may be obtained from the cracking of ethane and containing 1.77 moles of ethylene and 1.46 moles of acetylene was passed with 2.07 moles of hydrogen chloride over a zinc chloride impregnated active carbon catalyst at 160° C. using a contact time of 60 to 65 seconds. The catalyst was prepared by immersing granular activated carbon in a solution of 40 grams of anhydrous zinc chloride in 200 milliliters of water. The carbon was drained and dried in an atmosphere of nitrogen at 150° C. and the treatment was repeated. The products scrubbed from the gas stream were separated by fractional distillation and comprised 1.25 moles of ethyl chloride and 0.18 mole of vinyl chloride. Hydrocarbons in the exit gas stream were 1.12 moles of acetylene and 0.51 mole of ethylene. The gas was suitable for the conversion of the contained acetylene, for example, to vinyl chloride as described in Example I–B. The yield of ethyl chloride based on the ethylene removed from the gas was over 99%.

*Example I–B*

A gas mixture such as may be obtained from the preparation of ethyl chloride as described in Example I–A and containing 0.96 mole of acetylene and 1.25 moles of ethylene was mixed with 1.483 moles of hydrogen chloride and passed over a catalyst comprising about 80% of 4–6 mesh activated carbon, about 20% of barium chloride and a trace of mercuric chloride. In addition mercury vapor was added to the reactant gas stream continuously. The temperature in the major portion of the catalyst bed varied from 100 to 190° C. The contact time was 15 to 20 seconds. Vinyl chloride amounting to 0.823 mole was condensed from the gas stream. The exit gas analyzed 0.051 mole of acetylene and 1.29 moles of ethylene and was suitable for recycling to a first stage hydrochlorination of the contained ethylene.

*Example II*

A gas mixture similar to that which may be obtained in the ethyl chloride reaction and comprising 0.61 mole of acetylene and 0.76 mole of ethylene was passed through an aqueous solution containing 50% solids and comprising, per 1000 parts by weight of solution, 172 of cuprous chloride, 293 parts of cupric chloride ($CuCl_2.2H_2O$), 98 parts of ammonium chloride, 340 parts of concentrated hydrochloric acid and 99 parts of additional water. The temperature was maintained at 80 to 82° C. Dichloroethylene and water were removed by refrigeration of the product stream. The former amounted to 0.39 mole corresponding to a yield based on the acetylene consumed of 81% and on the acetylene charged of 64%. The residual gas comprising 0.13 mole of acetylene and 0.76 mole of ethylene was suitable for recycling to an ethyl chloride-forming first step.

*Example III*

An acetylene-ethylene mixture such as may be obtained as described in the manufacture of ethyl chloride was treated to convert the contained acetylene to dichloroethylene. A catalyst solution was prepared by dissolving 437 grams of cuprous chloride, 755 grams of cupric chloride ($CuCl_2.2H_2O$) and 474 parts of ammonium chloride in 320 parts of hydrochloric acid and 1950 parts of additional water. It contained 38.4% of solids and about 5% hydrochloric acid. It was heated to 80 to 98.5° C. and a gas mixture comprising 3.12 moles of acetylene and 2.64 moles of ethylene was introduced during a period of 5.65 hours. The dichloroethylene was separated from the gas stream by refrigeration and amounted to 1.77 moles of 56% based on acetylene charged and 78% on acetylene converted. Analysis indicated 0.85 mole of acetylene and 2.70 moles of ethylene in the exit gas. It was suitable for recycling to the first stage hydrochlorination reaction for conversion of the contained ethylene to ethyl chloride. The catalyst solution may be separately reoxidized with hydrogen chloride and air to convert cuprous to cupric chloride.

Example IV

For conversion of the acetylene content of a gas mixture, such as may be obtained from the ethyl chloride synthesis, to vinyl acetate, the gas is mixed with acetic acid and passed over a suitable catalyst. A catalyst was prepared by saturating 245 parts of 8-14 mesh active carbon in a 30% aqueous solution of zinc acetate. The damp catalyst mixture was dried by packing in a tube and passing dry nitrogen therethrough at 180° C. for 1.5 hours. Subsequently, additional nitrogen was passed through acetic acid maintained at 80° C. and then over the catalyst at 180° C. for 0.75 hour. The gas mixture was passed through acetic acid maintained at 67-74° C. to obtain a composition comprising 2.47 moles of acetylene, 2.42 moles of ethylene and 0.734 mole of acetic acid. The acetic acid-bearing gas mixture was then passed over the catalyst at 210° C. using a contact time of 27 seconds. Vinyl acetate and acetic acid were removed from the gas by refrigeration. The yield of vinyl acetate, 0.434 mole, was 18% based on the acetylene charged and 62% based on the acetylene consumed. The residue gas, analyzing 1.75 moles of acetylene and 2.47 moles of ethylene was suitable for recycling to convert the contained ethylene to ethyl chloride as described in the first example.

My invention will be further described by reference to the accompanying drawing in which a simplified flow diagram of the invention is shown. The charge gas mixture, e. g. a mixture of unsaturates approximating equimolar proportions of acetylene and ethylene derived from ethane cracking for example, is introduced to the system as indicated by line 10 and together with recycle gas in line 11 is charged to ethylene reaction zone 12. In the ethylene reaction zone, the charge gas is contacted with hydrogen chloride, introduced as indicated by line 13 over a zinc chloride-impregnated active carbon catalyst at elevated temperature. The effluent reaction mixture is passed as indicated by line 14 to a separation zone 15. In the operations of the separation zone, ethyl chloride, as indicated by line 16 is recovered as a primary product. The unreacted gas stream is separated and passed as indicated by line 17 to acetylene reaction zone 18 in which it is contacted with a reactant selective for acetylene in the presence of ethylene, introduced as indicated by line 19. The effluent reaction mixture is passed as indicated by line 20 to a second separation zone 21 wherein the acetylene reaction product, as indicated by line 22, is recovered and the residual gas stream is separated for recycle through line 11. The recycle gas stream may be purged to control build-up of saturates as desired by diversion of a slip stream to the gas clean-up section of the gas cracking unit.

I claim:

In the chemical utilization of acetylene and ethylene mixtures without pre-separation thereof, the steps of passing a mixture of acetylene and ethylene through a reaction zone with hydrogen chloride in contact with a zinc chloride-impregnated activated carbon catalyst at a temperature of about 140° to 200° C., recovering ethyl chloride from the reaction products and separating a residual gas stream enriched in acetylene.

References Cited in the file of this patent

UNITED STATES PATENTS

| | | |
|---|---|---|
| 2,097,750 | Arnold et al. | Nov. 2, 1937 |
| 2,350,984 | Britton et al. | June 13, 1944 |
| 2,520,712 | Cheney | Aug. 29, 1950 |